United States Patent
Sawada et al.

(10) Patent No.: US 9,781,308 B2
(45) Date of Patent: Oct. 3, 2017

(54) NON-TRANSITORY COMPUTER-READABLE MEDIUM

(71) Applicant: Brother Kogyo Kabushiki Kaisha, Nagoya-shi, Aichi-ken (JP)

(72) Inventors: Kazuhide Sawada, Nagoya (JP); Hiroko Mori, Handa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 10 days.

(21) Appl. No.: 15/077,678

(22) Filed: Mar. 22, 2016

(65) Prior Publication Data

US 2016/0295076 A1 Oct. 6, 2016

(30) Foreign Application Priority Data

Mar. 31, 2015 (JP) .................................. 2015-071635
Mar. 31, 2015 (JP) .................................. 2015-071642

(51) Int. Cl.
*H04N 1/60* (2006.01)
*H04N 1/407* (2006.01)

(52) U.S. Cl.
CPC ......... *H04N 1/6027* (2013.01); *H04N 1/4074* (2013.01); *H04N 2201/0082* (2013.01)

(58) Field of Classification Search
CPC .................................................. H04N 1/6066
See application file for complete search history.

(56) References Cited

U.S. PATENT DOCUMENTS

| 6,873,436 B1 * | 3/2005 | Terada ............... H04N 1/644 358/1.9 |
| 2010/0091348 A1 | 4/2010 | Iwamoto |
| 2010/0231995 A1 * | 9/2010 | Tsunematsu ......... G06K 9/4652 358/530 |

FOREIGN PATENT DOCUMENTS

| JP | H01-219967 A | 9/1989 |
| JP | H10-257325 A | 9/1998 |
| JP | 2002-142128 A | 5/2002 |

OTHER PUBLICATIONS

Nov. 16, 2016—(EP) Extended European Search Report—App 16161336.9.
J. M. Silva et al., "Enhancing the Quality of Color Documents with Back-to-Front Interference", Jul. 6, 2009, Image Analysis and Recognition, Berlin, Heidelberg pp. 875-885, XP1019122452.

* cited by examiner

*Primary Examiner* — Ibrahim Siddo
(74) *Attorney, Agent, or Firm* — Banner & Witcoff, Ltd.

(57) ABSTRACT

A non-transitory computer-readable medium stores computer-readable instructions. The instructions, when executed by a processor of an image processing apparatus, perform processes. The processes include registering, in a storage, a candidate color for each of a plurality of divided areas included in image data indicating an image on a sheet. The processes further include identifying, from among a plurality of pixels included in the image data, a target pixel based on a color value of the target pixel. The processes further include replacing the color value of the identified target pixel with a target color when a condition based on the color value of the identified target pixel and a color value of the target color is satisfied.

5 Claims, 15 Drawing Sheets

NON-TRANSITORY COMPUTER-READABLE MEDIUM

CROSS-REFERENCE TO RELATED APPLICATION

This application claims priority to Japanese Patent Applications No. 2015-71635, filed Mar. 31, 2015, and No. 2015-71642, filed Mar. 31, 2015. The disclosure of the foregoing applications is incorporated herein by reference in its entirety.

BACKGROUND

The present disclosure relates to a non-transitory computer-readable medium that is configured to improve image quality of image data.

In related art, a technology to improve image quality of image data is known. For example, an image forming apparatus is known that detects a maximum position at which frequency is high in comparison to surrounding portions, from a density histogram generated based on an original document that has been read. When three or more maximum positions are detected, the image forming apparatus detects the maximum position at which the density is highest as an image peak position, detects the maximum position at which the density is lowest as a background peak position, and detects the maximum position that exists in an area between the image peak position and the background peak position as a show-through peak position. The image forming apparatus performs binarization on the image data, using an intermediate density between an image section and a show-through section as a threshold value, and provides the image data after density adjustment to an optical writing unit. Thus, an image with a density that is equal to or lower than that of the show-through section is inhibited from being reproduced on a recording paper.

For example, in a known image processing apparatus, a reduced color image is generated using an input image that has been converted to a low-resolution image. Candidate regions for a flat color region (FCR) are extracted by integrating adjacent pixels that are assigned to the same representative color from the reduced color image. The candidate regions are determined again using a higher resolution image than the reduced color image. The final FCR is determined by detecting a boundary of the FCR. A representative color of the determined FCR is selected. When the selected representative color is a color close to a pure color, the representative color is replaced by the pure color (for example, white). The input image is overwritten by the FCR, and thus image regeneration is performed.

SUMMARY

The embodiments herein provide a non-transitory computer-readable medium storing computer-readable instructions. The instructions, when executed by a processor of an image processing apparatus, perform processes. The processes include registering, in a storage, a candidate color for each of a plurality of divided areas included in image data indicating an image on a sheet. The candidate color is a color value of a representative color representing color values of a plurality of pixels included in the divided area. The processes further include identifying, from among a plurality of pixels included in the image data, a target pixel based on a color value of the target pixel. The processes further include replacing the color value of the identified target pixel with a target color when a condition based on the color value of the identified target pixel and a color value of the target color is satisfied. The target color is the candidate color closest to the color value of the target pixel among the plurality of candidate colors registered in the storage.

The embodiments herein also provide a non-transitory computer-readable medium storing computer-readable instructions. The instructions, when executed by a processor of an image processing apparatus, perform processes. The processes include identifying a first attribute pixel. The first attribute pixel is a pixel having a color value included in a first color range, among a plurality of pixels included in image data indicating an image on a sheet. The first color range is a color value range corresponding to a color of the sheet. The processes further include identifying a second attribute pixel. The second attribute pixel is a pixel having a color value included in a second color range, among the plurality of pixels included in the image data. The second color range includes color values less than a first threshold value and is a color value range different from the first color range. The processes further include registering, in a storage, a candidate color for each of a plurality of divided areas included in the image data. The candidate color is a color value of a representative color representing color values of a plurality of pixels included in the divided area. The processes further include replacing a color value of a target pixel included in the image data with a target color. The target pixel is a pixel different from the identified first attribute pixel and the identified second attribute pixel, among the plurality of pixels included in the image data. The target color is the candidate color closest to the color value of the target pixel among the plurality of candidate colors registered in the storage.

The embodiments herein also provide a non-transitory computer-readable medium storing computer-readable instructions. The instructions, when executed by a processor of an image processing apparatus, perform processes. The processes include registering, in a storage, a candidate color for each of a plurality of divided areas included in image data indicating an image on a sheet. The candidate color is a color value of a representative color representing color values of a plurality of pixels included in the divided area. The processes further include determining whether a first color distance is less than a first threshold value. The first color distance is a distance in a three-dimensional color space between a color value of a target pixel and a white reference value corresponding to a color value of white. The target pixel is one of the plurality of pixels included in the image data. The processes further include determining whether a color value of a target color is further separated from the white reference value than the color value of the target pixel in the three-dimensional color space. The target color is the candidate color closest to the color value of the target pixel among the plurality of candidate colors registered in the storage. The processes further include replacing, when it is determined that the first color distance is not less than the first threshold value or when it is determined that the color value of the target color is not further separated from the white reference value than the color value of the target pixel, the color value of the target pixel with the target color, without replacing the color value of the target pixel when it is determined that the first color distance is less than the first threshold value and it is determined that the color value of the target color is further separated from the white reference value than the color value of the target pixel.

BRIEF DESCRIPTION OF THE DRAWINGS

Embodiments of the present disclosure will be described below in detail with reference to the accompanying drawings in which.

DETAILED DESCRIPTION

With the known image processing apparatus, there is a possibility that the hue of the image data is different from that of the read original document. For example, when binarization is performed using, as a threshold value, the intermediate density between the image section and the show-through section, there is a case in which not only an object based on show-through is removed from the image data but also, for example, a neutral color object is removed. The neutral color is a color with a density that is between a density of a base color of a sheet and a density of a print color of characters. For that reason, according to the known technology, the neutral color is included in the show-through section. When an object required for the image data has a neutral color, if the neutral color object is uniformly subjected to image processing, the hue of the image data may significantly change.

Further, in the known overwriting of the input image by the FCR, there is a case in which the representative color obtained from the input image is replaced by a pure color. In a section in which the replaced representative color is used, there is a possibility that the hue of the regenerated image is significantly different from the hue of the input image. On the other hand, when the representative color obtained from the input image is not replaced, when pixels whose color is close to white, for example, are replaced by the representative color, the hue of the pixels after the replacement may be darker than the hue of the pixels before the replacement.

According to the present disclosure, a non-transitory computer-readable medium is provided that is configured to improve image quality of image data while maintaining a hue of an image to some extent.

Figure 1:
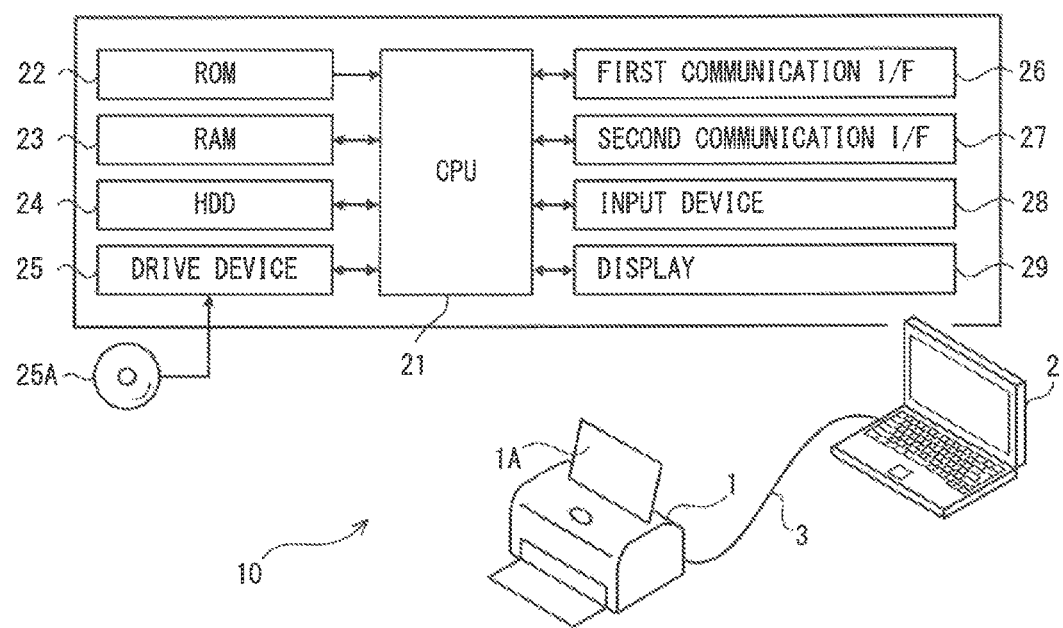
FIG. 1 is an overall structural drawing of an image processing system.

An embodiment of the present disclosure will be described with reference to the drawings. An image processing system 10 will be described with reference to FIG. 1. The image processing system 10 is provided with an image reading apparatus 1 and a personal computer (PC) 2. The image reading apparatus 1 and the PC 2 are connected via a communication cable 3. The image reading apparatus 1 reads an image from an original document 1A using a built-in image sensor. Specifically, the image sensor emits light onto the original document 1A and detects the light reflected back from the original document 1A, thus reading an image from the original document 1A. The image reading apparatus 1 converts the read image to image data. Hereinafter, the image of the original document 1A read by the image reading apparatus 1 is referred to an "original image," and the original image converted to data is referred to as "original image data." The image reading apparatus 1 of the present embodiment generates the original image data for one page every time it reads an image from a sheet of the original document 1A.

The image reading apparatus 1 outputs the original image data to the PC 2 via the communication cable 3. In the present embodiment, the image reading apparatus 1 is a known sheet feed scanner. The PC 2 receives the original image data output from the image reading apparatus 1 via the communication cable 3. As an example, the original image data is bitmap (BMP) image data that shows the original image using a plurality of pixels having color values of three primary colors (red, green, blue) of 256 gradations. Note that the image reading apparatus 1 is not limited to the sheet feed scanner, and may be another known image scanner, such as a flat bed scanner. The original image data is not limited to the BMP format, and may be another type of data, such as JPG, GIF and PNG formats.

An electrical configuration of the PC 2 will be described. The PC 2 is provided with a CPU 21 that controls the PC 2. The CPU 21 is electrically connected to a ROM 22, a RAM 23, an HDD 24, a drive device 25, a first communication interface (I/F) 26, a second communication I/F 27, an input device 28 and a display 29. A boot program, a basic input/output system (BIOS) and the like are stored in the ROM 22. Temporary data is stored in the RAM 23. The HDD 24 is formed by a non-transitory computer-readable storage medium, such as a hard disk, for example. Application programs (hereinafter simply referred to as "programs") to cause the CPU 21 to perform processing, and an operating system (OS) are stored in the HDD 24. The programs include a driver program to cause the image reading apparatus 1 to perform image reading. The HDD 24 is provided with a data buffer in which the original image data received from the image reading apparatus 1 via the communication cable 3 is stored.

The drive device 25 is configured to read out information stored in a storage medium 25A, such as an optical medium. Using the drive device 25, the CPU 21 can read out a program stored in the storage medium 25A, and can store the read out program in the HDD 24. The first communication I/F 26 is an interface element for the PC 2 to connect to the image reading apparatus 1 via the communication cable 3. The second communication I/F 27 is an interface element for the PC 2 to connect to another device via a network not shown in the drawings. The input device 28 includes, for example, buttons, a keyboard and a mouse etc. The display 29 is a liquid crystal display (LCD).

Note that the HDD 24 may be replaced by another non-transitory storage medium, such as, for example, a flash memory and/or a ROM. It is sufficient if the non-transitory storage medium is a storage medium that is configured to hold information regardless of the period during which the information is stored. The non-transitory storage medium need not necessarily include a transitory storage medium (for example, a transmitted signal). A general-purpose processor may be used as the CPU 21. A part of the processing that is performed by the CPU 21 may be performed by another electronic device (for example, an ASIC). The processing that is performed by the CPU 21 may be performed through distributed processing by a plurality of electronic devices (more specifically, a plurality of CPUs). The programs may be downloaded (i.e., transmitted as transmission signals) from a server connected to a network not shown in the drawings, and may be stored in the HDD 24. In this case, the programs are stored in a non-transitory storage medium, such as an HDD provided in the server.

The processing that is performed by the CPU 21 of the PC 2 will be described. In the present embodiment, after a user sets the original document 1A on the image reading apparatus 1, the user operates the PC 2 and activates the driver program. The CPU 21 executes the activated driver program, and transmits an image reading instruction to the image reading apparatus 1 in response to the operation by the user. The image reading apparatus 1 that has received the image reading instruction reads an image from the original document 1A, generates original image data, and transmits the generated original image data to the PC 2.

In the present embodiment, the user can select whether to perform a noise removal function via an interface screen that is provided by the driver program. When a noise image is included in the image data, the noise removal function is a function to remove or reduce the noise image. Examples of the noise image include a foreign matter image and a show-through image. The foreign matter image is an image of foreign matter (for example, dirt and stains etc.) that is other than the image printed on an original document. The show-through image is an image that appears when an image displayed on a surface opposite to a reading surface of the original document can be seen through the original document and appears on the reading surface side. Further, when a background pattern of the original document is not necessary, the background pattern may also be considered to be noise image.

When the execution of the noise removal function is selected, based on the driver program, the CPU 21 performs main processing (refer to FIG. 2) on the original image data received from the PC 2. Note that, every time the original image data is received from the PC 2, the CPU 21 may automatically perform the main processing on the received original image data. When the user specifies the original image data and instructs the execution of the noise removal function, the CPU 21 may perform the main processing on the specified original image data.

Figure 2:
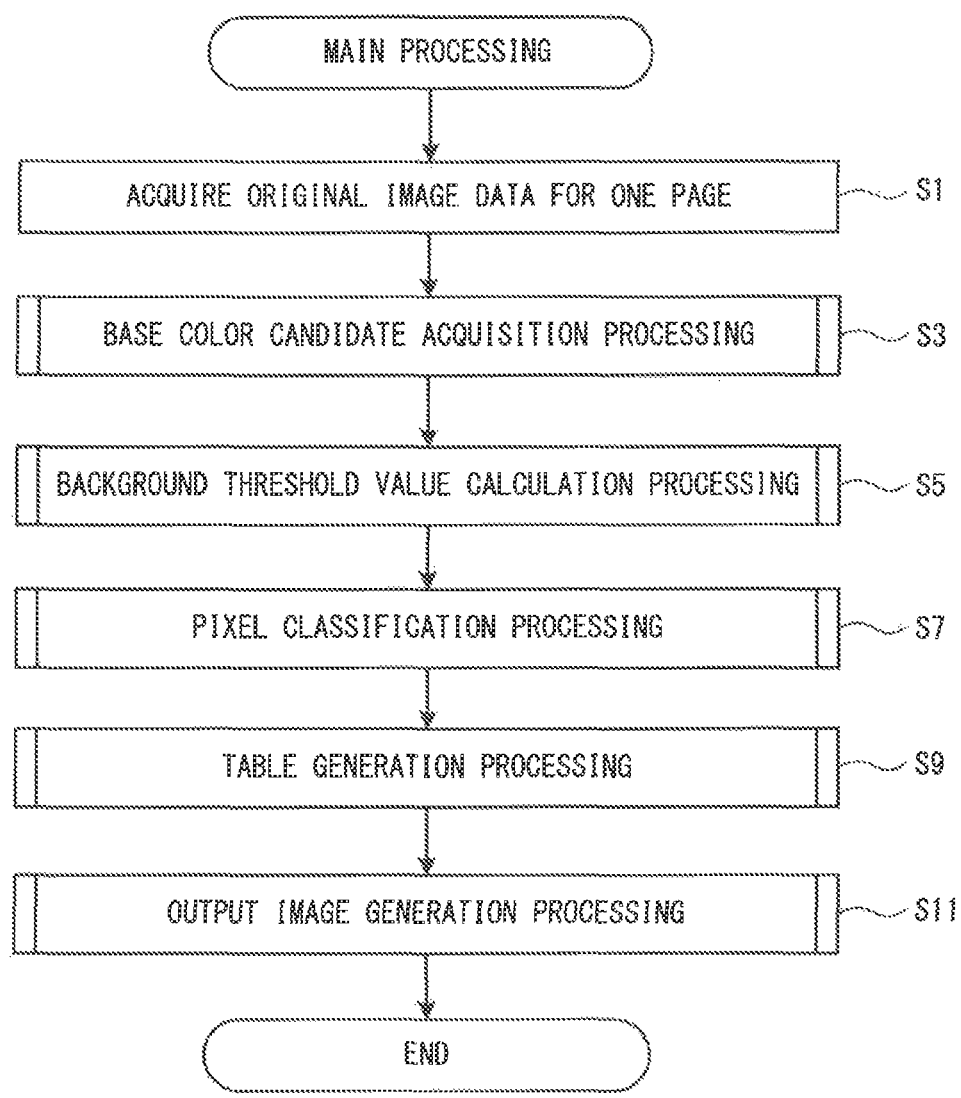
FIG. 2 is a flowchart of main processing.

In the main processing shown in FIG. 2, first, the CPU 21 acquires the original image data for one page from the HDD 24, and reads out the original image data to the RAM 23 (step S1). Note that the CPU 21 performs each step of processing described below on a storage area of the RAM 23. Next, the CPU 21 performs base color candidate acquisition processing shown in FIG. 3 (step S3). The base color is a sheet color of the original document 1A read by the image reading apparatus 1.

Figure 3:
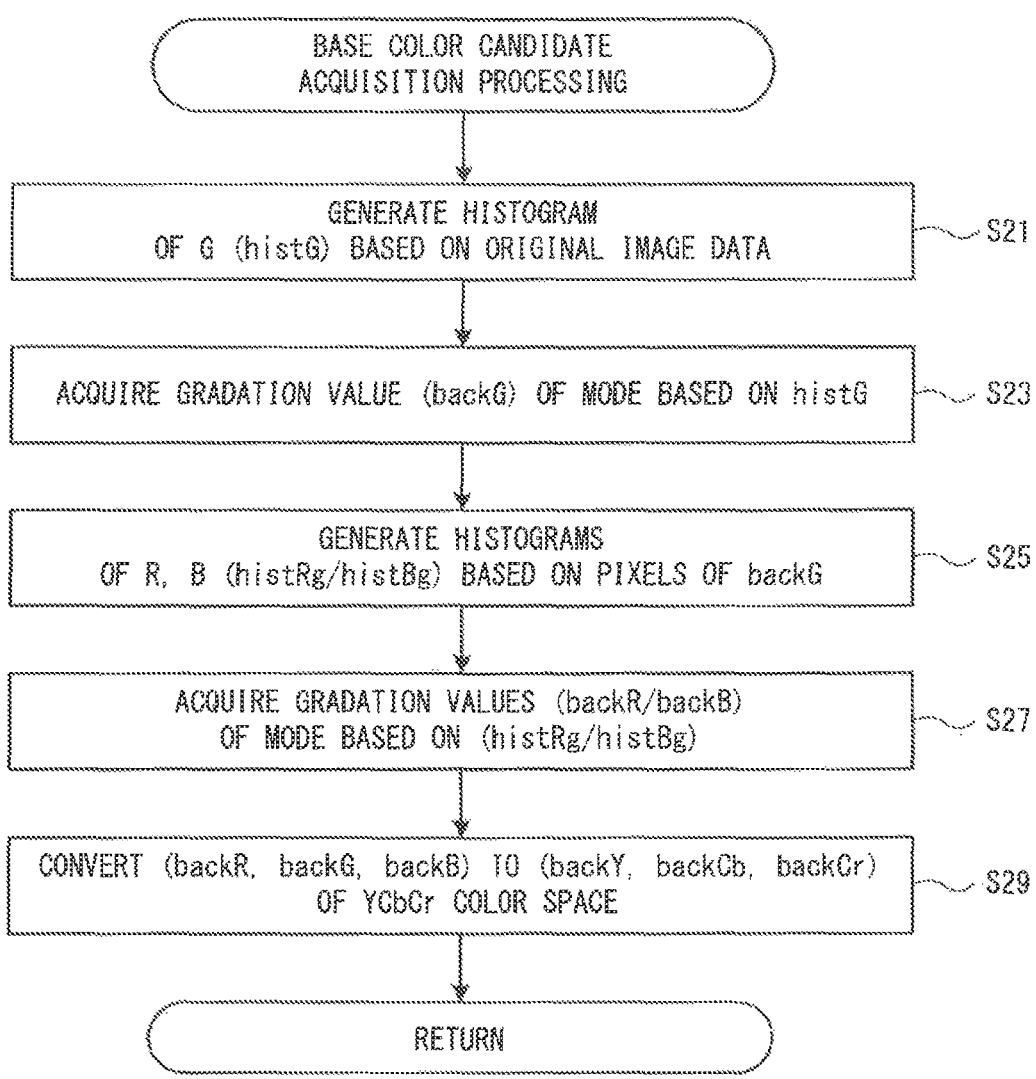
FIG. 3 is a flowchart of base color candidate acquisition processing.

As shown in FIG. 3, first, the CPU 21 generates histG, which is a histogram of G (i.e., green color) values, based on the original image data acquired at step S1 (step S21). More specifically, based on the respective G values of all the pixels (for example, 600 pixels×400 pixels=240,000 pixels) of the original image data, the CPU 21 generates a histogram whose horizontal axis indicates 256 gradations of the G value and whose vertical axis indicates frequency (the number of pixels). Based on the generated histG, the CPU 21 acquires backG, which is the G value of the mode (step S23). The mode is a gradation value at which the number of pixels is the largest in the histogram.

A section of the read image corresponding to a section of the read original document where no image is printed is referred to as a base color image. In a normal read image, the base color image occupies the largest area of the read image, and the base color image is formed by a visually bright color (for example, a high luminance color). Of the three primary colors (red, green, blue), green has characteristics closest to a color element (for example, luminance) indicating color brightness. Therefore, based on the histogram of the G values (histG), the CPU 21 can more accurately identify pixels that are likely to indicate the base color image, as well as the quantity and the G values of the pixels.

Based on all the pixels having the acquired backG, the CPU 21 generates histRg, which is a histogram of R values, and histBg, which is a histogram of B values (step S25). For example, when the number of pixels having backG of the original image data is 180,000, the CPU 21 generates histRg and histBg using the 180,000 pixels only. histRg is a histogram whose horizontal axis indicates 256 gradations of red and whose vertical axis indicates frequency (the number of pixels). histBg is a histogram whose horizontal axis indicates 256 gradations of blue and whose vertical axis indicates frequency (the number of pixels). Based on the generated histRg, the CPU 21 acquires backR, which is the R value of the mode, and based on the generated histBg, the CPU 21 acquires backB, which is the B value of the mode (step S27). Thus, the CPU 21 acquires the R value and the B value of each of the pixels that are likely to indicate the base color image.

Next, the CPU 21 converts the acquired color values (backR, backG, backB) in an RGB color space to color values in a YCbCr color space (step S29). Thus, the CPU 21 acquires candidate colors (backY, backCb, backCr) for the base color. When the color values in the RGB color space are converted to the color values in the YCbCr color space, the CPU 21 may calculate a Y value (luminance), a Cb value and a Cr value using the following Expressions (1) to (3). Note that ">>10" in Expressions (1) to (3) indicates a bit shift operation of shifting to right by 10 bits, i.e., multiplication by $2^{-10}$ (=1/1,024).

$$Y=(306 \times R+601 \times G+117 \times B) >> 10 \qquad \text{Expression (1)}$$

$$Cb=(-174 \times R-338 \times G+512 \times B) >> 10 \qquad \text{Expression (2)}$$

$$Cr=(512 \times R-430 \times G-82 \times B) >> 10 \qquad \text{Expression (3)}$$

After that, the CPU 21 returns the processing to the main processing (refer to FIG. 2). Note that, in order to change the Cb value and the Cr value to positive integers, "128" may be added to each of the values obtained by the above-described Expression (2) and Expression (3).

Figure 4:
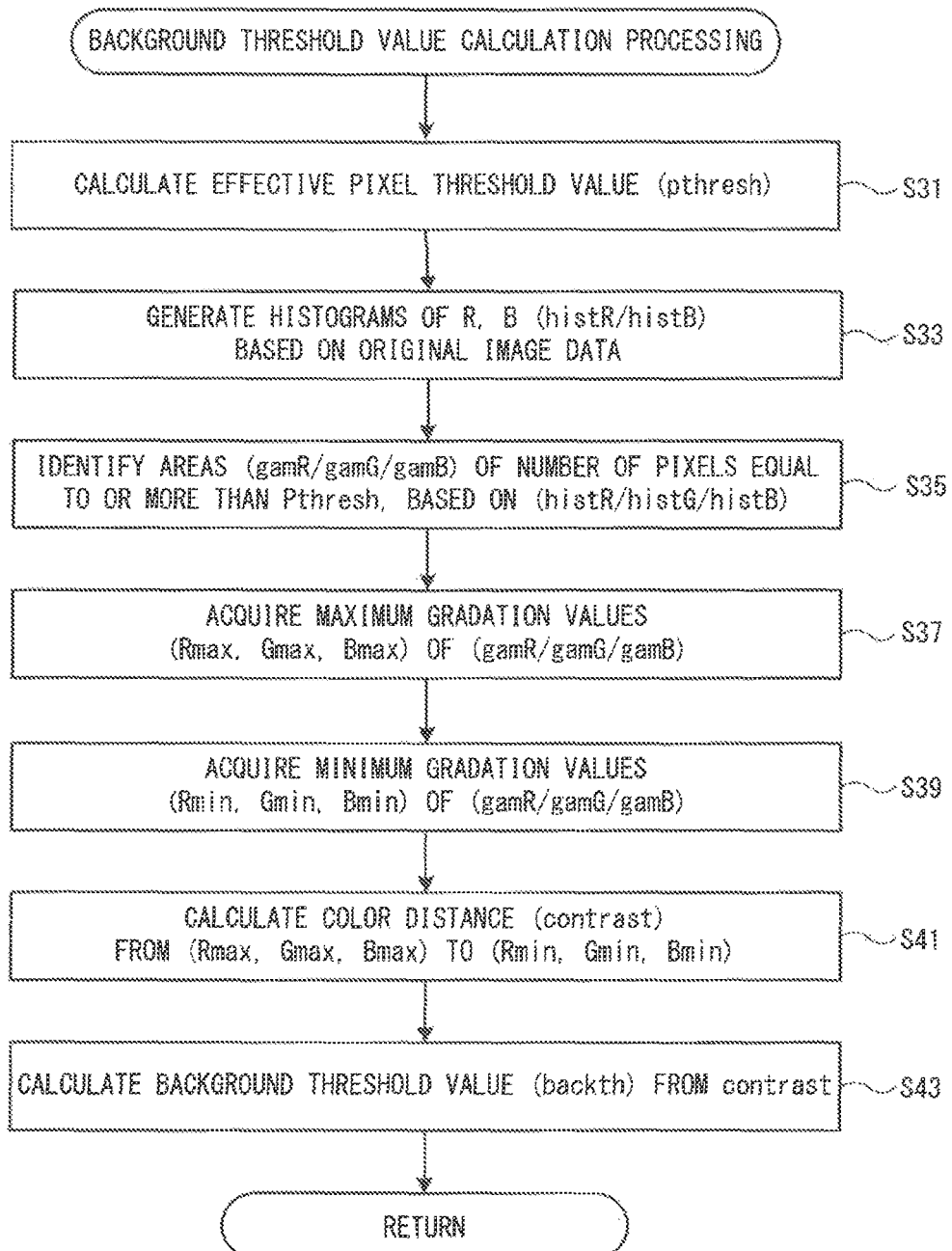
FIG. 4 is a flowchart of background threshold value calculation processing.

In the main processing shown in FIG. 2, after performing the processing at step S3, the CPU 21 performs background threshold value calculation processing shown in FIG. 4 (step S5). As shown in FIG. 4, first, the CPU 21 calculates an effective pixel threshold value (pthresh) (step S31). pthresh is a threshold value for determining pixels included in an effective image area of the original image. The effective image area is an area excluding an invalid image (a minute image, such as dirt or a stain etc., for example) included in the original image. In other words, the invalid image is an image having a color value with a very small frequency in the original image. In the present embodiment, the CPU 21 multiplies the total number of pixels of the original image data by a few percent (for example, two to three percent), thus calculating pthresh.

Next, in the same manner as at step S21, based on all the pixels of the original image data acquired at step S1, the CPU 21 generates histR, which is a histogram of the R values, and histB, which is a histogram of the B values (step S33). Based on the histograms (histR/histG/histB) generated at step S21 and step S33, the CPU 21 identifies each of pixel number areas (gamR/gamG/gamB) in which the number of pixels is equal to or more than pthresh (step S35). The CPU 21 acquires a maximum gradation value (Rmax, Gmax, Bmax) for each of the identified pixel number areas (gamR/gamG/gamB) (step S37). The CPU 21 acquires a minimum gradation value (Rmin, Gmin, Bmin) for each of the identified pixel number areas (gamR/gamG/gamB) (step S39).

Figure 5:
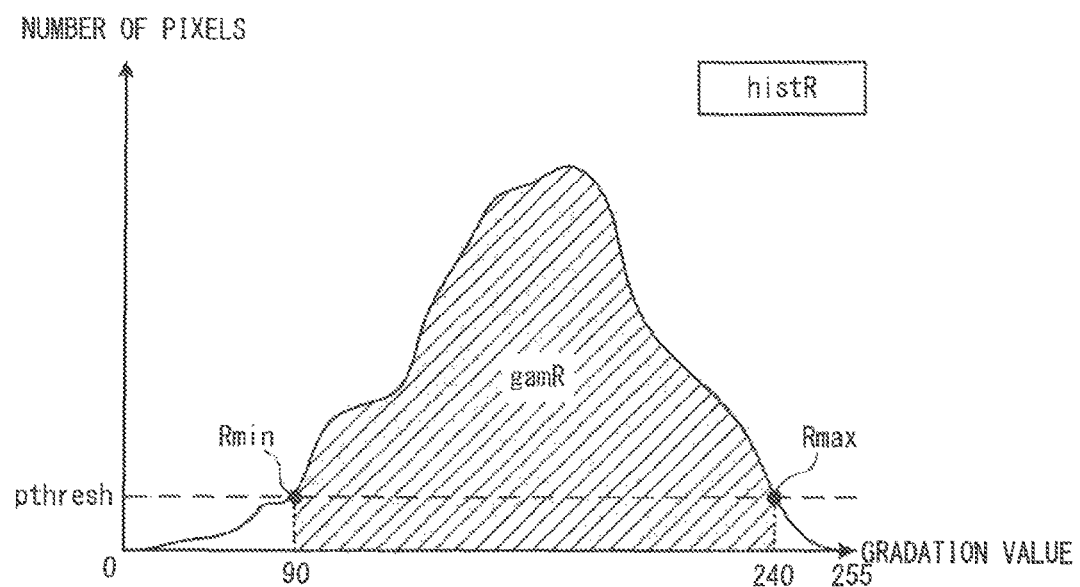
FIG. 5 is a specific example of a histogram that is generated by the background threshold value calculation processing.

For example, based on all the pixels (for example, 240,000 pixels) of the original image data, the CPU 21 generates histR shown in FIG. 5 (step S33). In histR shown in FIG. 5, the CPU 21 identifies, as gamR, the pixel number area in which the number of pixels is equal to or more than pthresh (step S35). In histR shown in FIG. 5, the CPU 21 acquires, as Rmax, the maximum gradation value "240" of gamR and acquires, as Rmin, the minimum gradation value "90" of gamR (step S37, step S39). The CPU 21 may acquire Gmax, Bmax, Gmin and Bmin in the same manner as the example shown in FIG. 5.

The CPU 21 calculates contrast, which is a distance from the maximum gradation value (Rmax, Gmax, Bmax) to the minimum gradation value (Rmin, Gmin, Bmin) (step S41). For example, contrast is a Euclidean distance in the RGB color space. The CPU 21 may calculate contrast using the following Expression (4).

$$\text{contrast}=\sqrt{((R\max-R\min)^2+(G\max-G\min)^2+(B\max-B\min)^2)} \quad \text{Expression (4)}$$

The CPU 21 calculates a background threshold value (backth) from the calculated contrast (step S43). For example, backth is a threshold value for determining pixels having color values included in a color range of a background color including the base color. The background color is a collective term of the base color and approximate colors of the base color. For example, the CPU 21 calculates backth using the following Expression (5).

$$\text{backth}=((\text{MAXTH}-\text{MINTH})\times(\text{contrast}-\text{MINCON})/(\text{MAXCON}-\text{MINCON}))+\text{MINTH} \quad \text{Expression (5)}$$

Note that MAXTH is a constant threshold value indicating an upper limit of backth and is "60," for example. MINTH is a constant threshold value indicating a lower limit of backth and is "30," for example. backth is a variable between MINTH and MAXTH. MAXCON is a constant indicating an upper limit of contrast and is "245," for example. When the value of contrast is MAXCON, backth is equal to MAXTH. MINCON is a constant indicating a lower limit of contrast and is "105," for example. When the value of contrast is MINCON, backth is equal to MINTH.

When backth calculated by Expression (5) is equal to or more than MINTH and equal to or less than MAXTH, the CPU 21 sets the calculated backth as a calculation result. Note that, when backth calculated by Expression (5) exceeds MAXTH, the CPU 21 determines backth to be MAXTH. When backth calculated by Expression (5) is less than MINTH, the CPU 21 determines backth to be MINTH. After that, the CPU 21 returns the processing to the main processing (refer to FIG. 2).

Figure 6:
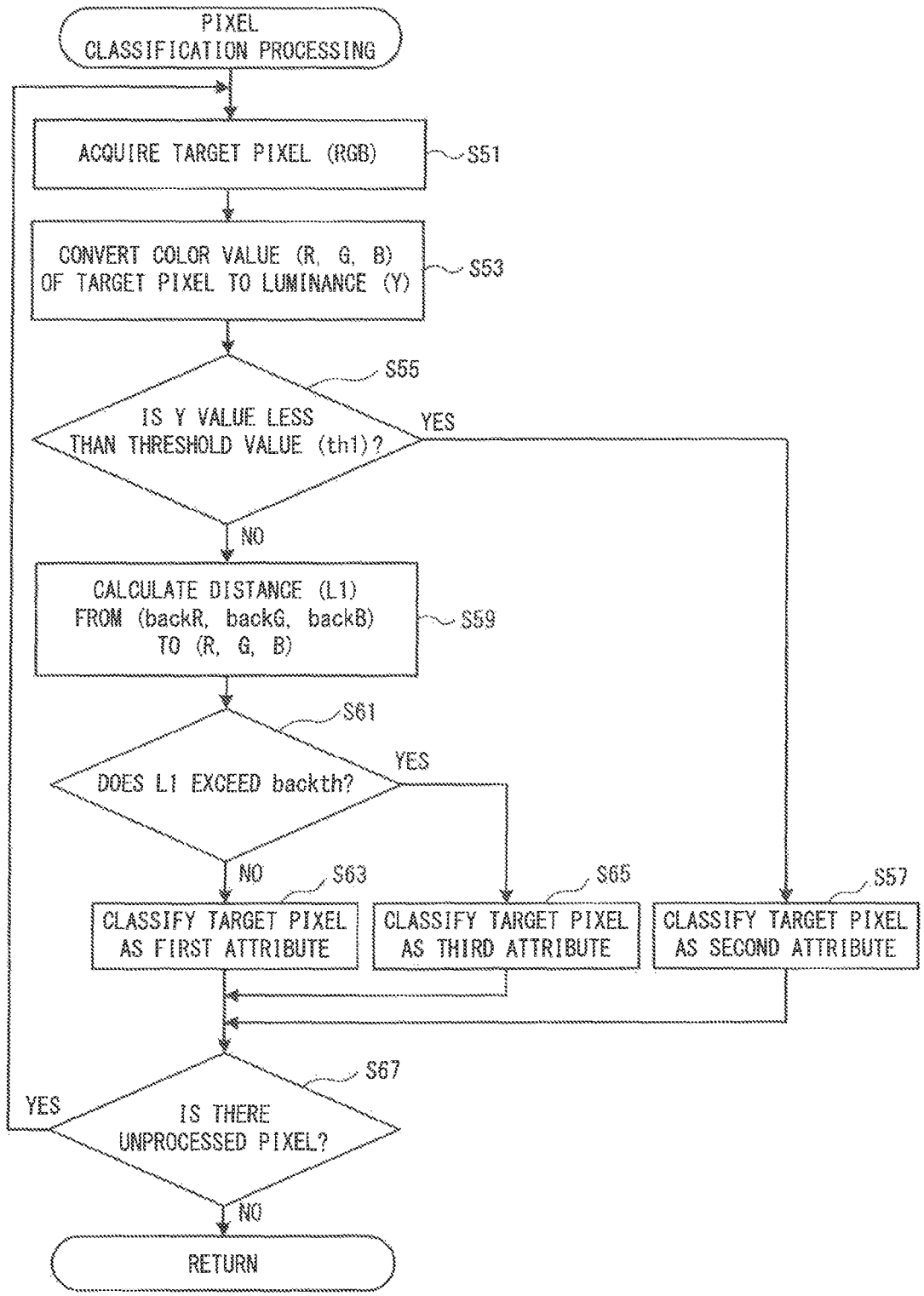
FIG. 6 is a flowchart of pixel classification processing.

In the main processing shown in FIG. 2, after performing the processing at step S5, the CPU 21 performs pixel classification processing shown in FIG. 6 (step S7). As shown in FIG. 6, first, the CPU 21 acquires a target pixel in the RGB color space from the original image data (step S51). The target pixel acquired at step S51 is, among all the pixels of the original image data, one of unprocessed pixels for which the pixel classification processing has not been performed. The CPU 21 converts the color value (R, G, B) of the acquired target pixel to the luminance (the Y value) using Expression (1) (step S53). The CPU 21 determines whether the converted Y value is less than a threshold value (th1) (step S55). th1 is a threshold value for determining dark color pixels and is "64," for example. The dark color is, for example, a color that represents characters and graphics etc. and whose luminance is low (namely, a visually dark color).

When it is determined that the Y value is less than th1 (yes at step S55), the color value of the target pixel is included in a dark color range. In this case, the CPU 21 classifies the target pixel as a second attribute (step S57). The CPU 21 associates identification information of the target pixel with the second attribute, and stores the associated information in the RAM 23. The second attribute is pixel attribute information indicating that the color value of the target pixel corresponds to a dark color.

When it is determined that the Y value is not less than th1 (no at step S55), the CPU 21 calculates a distance L1, which is a distance from the RGB value (backR, backG, backB) of the candidate color for the base color to the color value (R, G, B) of the target pixel (step S59). L1 is a Euclidean distance in the RGB color space. The CPU 21 may calculate L1 using the same technique as Expression (4).

The CPU 21 determines whether the calculated L1 exceeds backth calculated at step S43 (step S61). When it is determined that L1 does not exceed backth (no at step S61), the color value of the target pixel is included in the color range of the background color. In this case, the CPU 21 classifies the target pixel as a first attribute (step S63). The CPU 21 associates the identification information of the target pixel with the first attribute, and stores the associated information in the RAM 23. The first attribute is pixel attribute information indicating that the color value of the target pixel corresponds to the background color.

When it is determined that L1 exceeds backth (yes at step S61), the color value of the target pixel is included in a neutral color range. The neutral color is a color whose luminance is lower than the background color and higher than the dark color. More specifically, the neutral color is a visually darker color than the background color and is a visually brighter color than the dark color. A color range of the neutral color is between the color range of the background color and the color range of the dark color. In this case, the CPU 21 classifies the target pixel as a third attribute (step S65). The CPU 21 associates the identification information of the target pixel with the third attribute, and stores the associated information in the RAM 23. The third attribute is pixel attribute information indicating that the color value of the target pixel corresponds to the neutral color.

After performing the processing at one of step S57, step S63 and step S65, the CPU 21 determines whether there is an unprocessed pixel (step S67). When it is determined that there is no unprocessed pixel (no at step S67), the CPU 21 returns the processing to the main processing (refer to FIG. 2). When it is determined that there is an unprocessed pixel (yes at step S67), the CPU 21 returns the processing to step S51, and acquires a subsequent unprocessed pixel as the target pixel. The processing from step S51 onward is the same as that described above.

Figure 7:
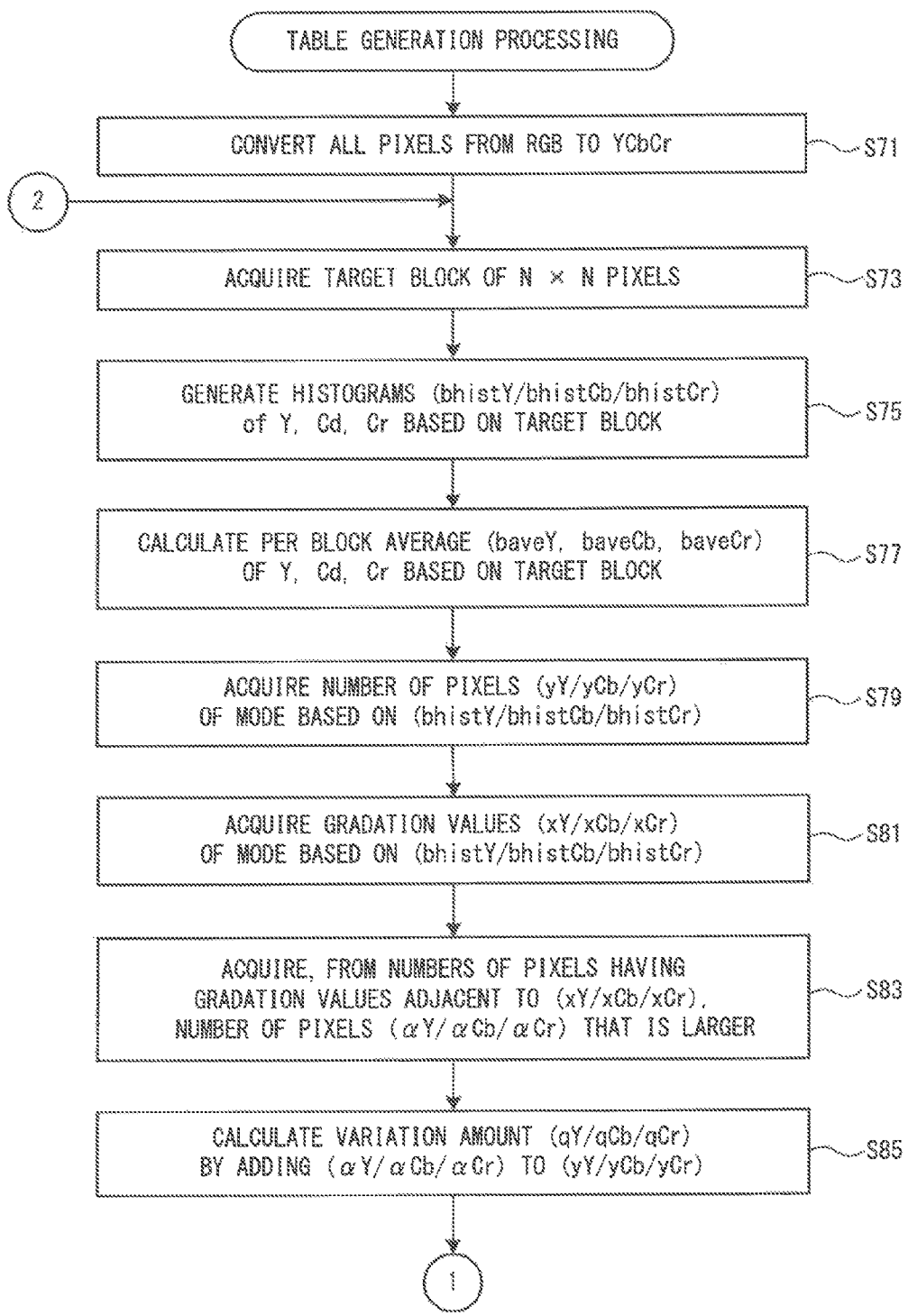
FIG. 7 is a flowchart of table generation processing.
Figure 8:
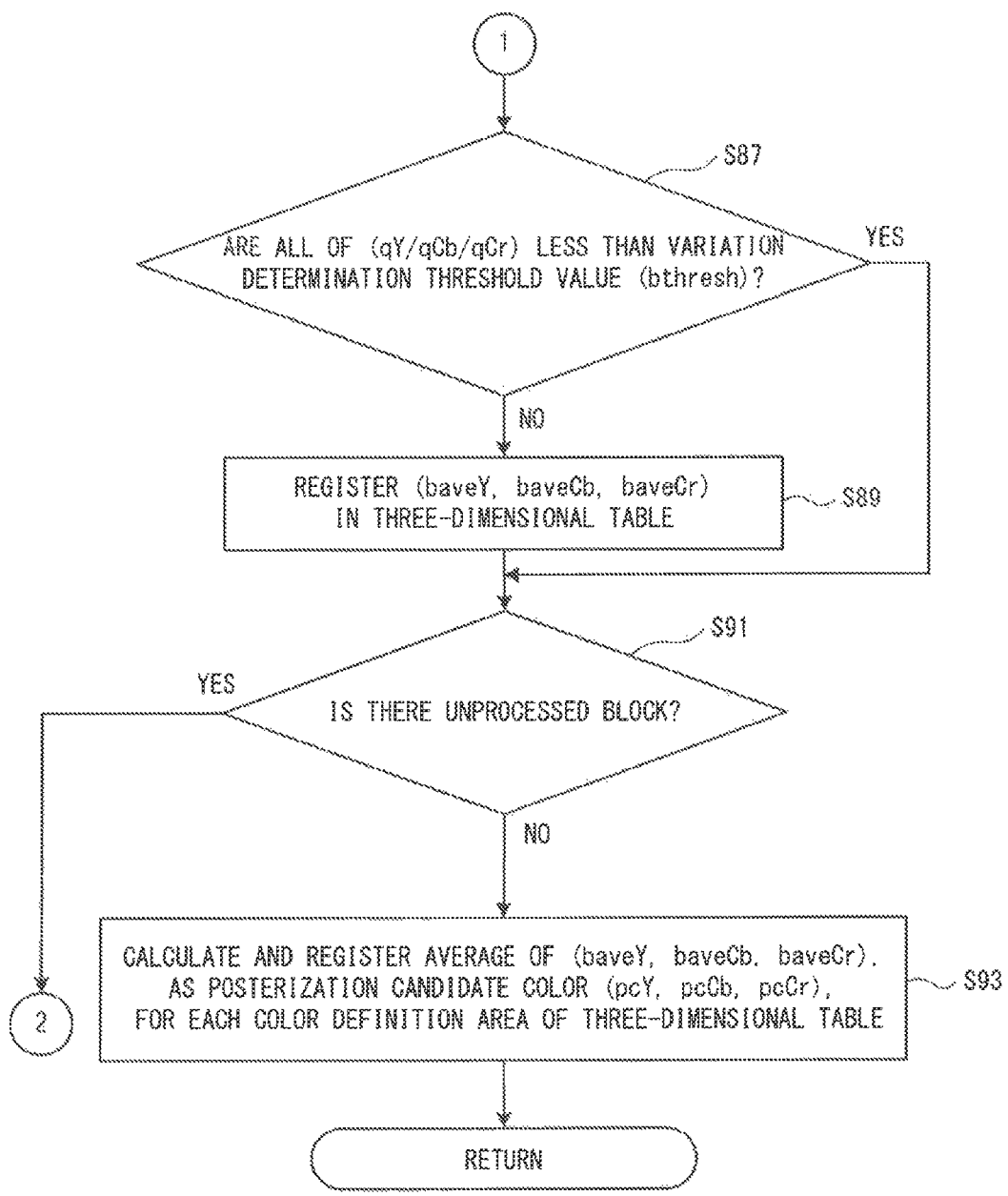
FIG. 8 is a flowchart of the table generation processing, and is a continuation of FIG. 7.

In the main processing shown in FIG. 2, after performing the processing at step S7, the CPU 21 performs table generation processing shown in FIG. 7 and FIG. 8 (step S9). As shown in FIG. 7, first, the CPU 21 converts each of the color values (R, G, B) of all the pixels of the original image data to each of the color values in the YCbCr color space, using Expressions (1) to (3) (step S71). Next, the CPU 21 acquires a target block of N×N pixels from the original image data (step S73). The target block acquired at step S73 is, among a plurality of divided blocks included in the original image data, one of unprocessed blocks for which the table generation processing has not been performed. The plurality of divided blocks are a plurality of square-shaped image areas obtained by dividing the original image into block units of N×N pixels in a grid shape.

The CPU 21 generates each of histograms (bhistY/bhistCb/bhistCr) of the Y values, the Cb values and the Cr values, based on all the pixels of the acquired target block (step S75). bhistY is a histogram generated based on each of the Y values of all the pixels of the target block, and its horizontal axis indicates 16 gradations of the Y value and its vertical axis indicates the frequency (the number of pixels). bhistCb is a histogram generated based on each of the Cb values of all the pixels of the target block, and its horizontal axis indicates 16 gradations of the Cb value and its vertical axis indicates the frequency (the number of pixels). bhistCr is a histogram generated based on each of the Cr values of all the pixels of the target block, and its horizontal axis indicates 16 gradations of the Cr value and its vertical axis indicates the frequency (the number of pixels).

Based on all the pixels of the acquired target block, the CPU 21 generates a per block average (baveY, baveCb, baveCr), which is an average value of each of the Y values, the Cb values and the Cr values (step S77). baveY is, for example, the Y mean value obtained by dividing the total of each of the Y values of all the pixels of the target block by the number of all the pixels of the target block. baveCb is, for example, the Cb mean value obtained by dividing the total of each of the Cb values of all the pixels of the target block by the number of all the pixels of the target block. baveCr is, for example, the Cr mean value obtained by dividing the total of each of the Cr values of all the pixels of the target block by the number of all the pixels of the target block. More specifically, the per block average indicates a color value of a representative color that represents the color values of the plurality of pixels included in the target block.

Based on each of the acquired histograms (bhistY/bhistCb/bhistCr), the CPU 21 acquires the number of pixels (yY/yCb/yCr) of each of the modes of the Y values, the Cb values and the Cr values (step S79). Based on each of the acquired histograms (bhistY/bhistCb/bhistCr), the CPU 21 acquires a gradation value (xY/xCb/xCr) of each of the modes of the Y values, the Cb values and the Cr values (step S81).

Based on each of the acquired histograms (bhistY/bhistCb/bhistCr), the CPU 21 acquires, from the numbers of pixels having gradation values adjacent to each of the acquired gradation values (xY/xCb/xCr), a number of the pixels ($\alpha$Y/$\alpha$Cb/$\alpha$Cr) that is larger (step S83). The CPU 21 calculates a variation amount (qY/qCb/qCr) by adding the acquired number of pixels ($\alpha$Y/$\alpha$Cb/$\alpha$Cr) to the number of pixels (yY/yCb/yCr) of each of the modes (step S85). The variation amount (qY/qCb/qCr) indicates an amount of variation of the color values of the plurality of pixels included in the target block.

Figure 9:
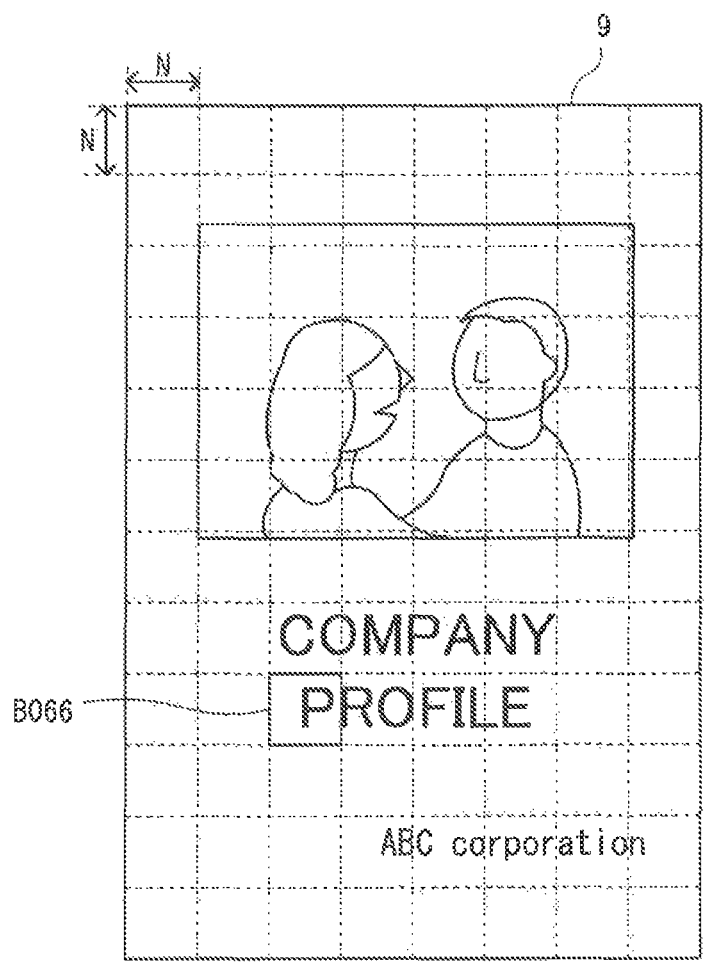
FIG. 9 is a specific example of original image data.

The processing shown in FIG. 7 will be described specifically with reference to FIG. 9 and FIG. 10. Original image data 9 shown in FIG. 9 is formed by 1,280×960 pixels and includes 96 divided blocks. Each of the divided blocks is an image area formed by 4,096 pixels (N=64). When a divided block "B066" is acquired as the target block (step S73), the CPU 21 generates bhistY shown in FIG. 10 based on each of the Y values of the 4,096 pixels included in the divided block "B066," and also calculates baveY (step S75 and step S77).

bhistY of the present example is a histogram in which 256 gradations of the Y value are indicated by 16 gradations (i.e., the number of bins). The width of one gradation (bin) corresponds to the 16 gradations of the 256 gradations of the Y value. The gradation value of each gradation (bin) is represented by the central value of the Y values corresponding to the width of that gradation. For example, a minimum bin (a first gradation) corresponds to the Y values "0" to "15." The central value of the minimum bin is the Y value "7.5." Based on bhistY, the CPU 21 acquires "2,800", which is the number of pixels of the mode of the Y values, as yY (step S79). Based on bhistY, the CPU 21 acquires the Y value "183", which is the central value of a twelfth gradation corresponding to yY "2,800," as xY (step S81).

Figure 10:
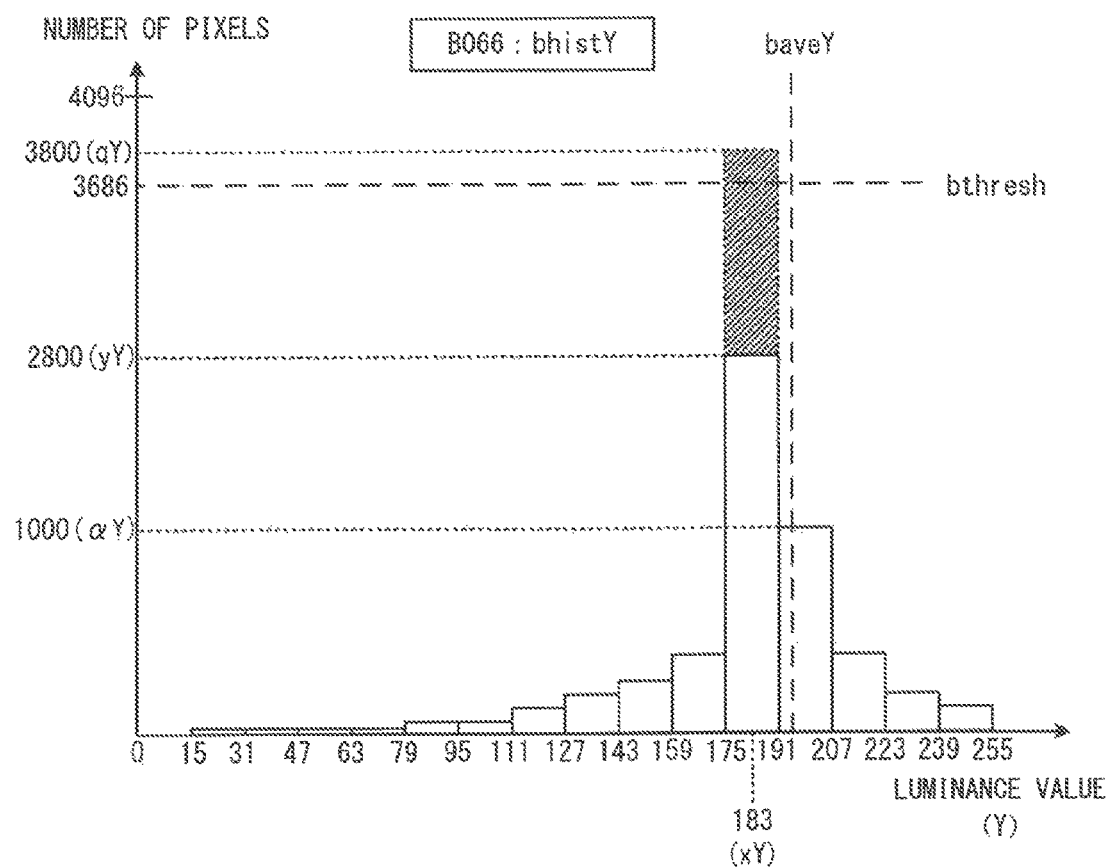
FIG. 10 is a specific example of a histogram that is generated by the table generation processing.

In bhistY shown in FIG. 10, gradation values adjacent to xy "183" are "167" that is the central value of an eleventh gradation, and "199" that is the central value of a thirteenth gradation. The number of pixels "1,000" of the gradation value "199" is larger than the number of pixels of the gradation value "167." Therefore, the CPU 21 acquires the number of pixels "1,000" of the gradation value "199," and adds "1,000" to yY "2,800," thus calculating qY "3,800" (step S83 and step S85). In the same manner as the example shown in FIG. 9 and FIG. 10, the CPU 21 may acquire baveCb, baveCr, qCb and qCr for the divided block "B066."

As shown in FIG. 8, after performing the processing at step S85, the CPU 21 determines whether all of the acquired variation amounts (qY/qCb/qCr) are less than a variation determination threshold value (bthresh) (step S87). bthresh is a threshold value for determining the variation of each of the color values of all the pixels in the target block. For example, the CPU 21 calculates, as bthresh, a value obtained by multiplying the number of all the pixels in the target block by "0.9." When it is determined that all of the variation amounts (qY/qCb/qCr) are less than bthresh (yes at step S87), the variation of each of the color values of all the pixels in the divided block is relatively large. In this case, the CPU 21 advances the processing to step S91 that will be described later.

When it is determined that at least one of the variation amounts (qY/qCb/qCr) is not less than bthresh (no at step S87), the variation of each of the color values of all the pixels in the divided block is relatively small. In this case, the CPU 21 stores the per block average (baveY, baveCb, baveCr) acquired at step S77 in a three-dimensional table 100 (refer to FIG. 11) that is stored in the RAM 23 (step S89).

The three-dimensional table 100 of the present embodiment is provided with 256 color definition areas, each of which defines a specific color range. The 256 color ranges that are defined by these color definition areas are cubic three-dimensional color ranges obtained by dividing the 256 gradations of the Y value, the Cb value and the Cr value by the 16 gradations, respectively, in the YCbCr color space. More specifically, each of the color definition areas defines the color range represented by the 16 gradation width of the Y value, the 16 gradation width of the Cb value and the 16 gradation width of the Cr value in the YCbCr color space of the 256 gradations. In the three-dimensional table 100, the CPU 21 registers the identification information and the per block average of the target block in the color definition area that defines a color range including the per block average of the target block.

After performing the processing at step S89, the CPU 21 determines whether there is an unprocessed block (step S91). When it is determined that there is an unprocessed block (yes at step S91), the CPU 21 returns the processing to step S73, and acquires a subsequent unprocessed block as the target block. The processing from step S73 onward is the same as that described above. When it is determined that there is no unprocessed block (no at step S91), the above-described processing has been performed on all the plurality of divided blocks included in the original image data. In the three-dimensional table 100, the per block averages of the same number as the divided blocks for which all of the variation amounts are equal to or more than bthresh are registered in the corresponding color definition areas, respectively.

In this case, the CPU 21 calculates and registers an average of the per block averages (baveY, baveCb, baveCr) registered in the respective color definition areas, as a posterization candidate color (pcY, pcCb, pcCr) (step S93). Note that the CPU 21 calculates the posterization candidate color for only the color definition area(s) in which the per block average is registered, among the plurality of color definition areas. When only the single per block average is registered in one of the color definition areas, the CPU 21 calculates the per block average as the posterization candidate color. The CPU 21 registers the calculated posterization candidate color in the three-dimensional table 100. After that, the CPU 21 returns the processing to the main processing (refer to FIG. 2).

The processing shown in FIG. 8 will be specifically described with reference to FIG. 10 and FIG. 11. In bhistY shown in FIG. 10, bthresh is obtained by multiplying 4,096 pixels by "0.9" and is "3,686 (cut off after the decimal point)." The CPU 21 determines that qY "3,800" is not less than bthresh. In the same manner as the example shown in FIG. 10, the CPU 21 determines whether each of yCb and yCr is less than bthresh. Since at least one (qY in the present example) of the variation amounts (qY/qCb/qCr) of the divided block "B066" is equal to or more than bthresh (no at step S87), the CPU 21 performs the processing at step S89 in the following manner.

The CPU 21 registers the per block average (baveY, baveCb, baveCr) of the divided block "B066" in the three-dimensional table 100 (step S89). In the three-dimensional table 100 shown in FIG. 11, the X axis indicates 256 gradations of the Cr value (−128 to 127), the Y axis indicates 256 gradations of the Y value (0 to 255), and the Z axis indicates 256 gradations of the Cb value (−128 to 127). The color definition areas of 256 blocks are provided in the three-dimensional table 100. A color definition area "ds000" is a color definition area including the origin position (0, 0, 0) of the three-dimensional table 100. The color definition area "ds000" is a storage area that defines a three-dimensional color range of the Y values "0 to 15", the Cr values "0 to 15" and the Cb values "0 to 15" in the YCrCb color space. The color definition area "ds000" corresponds to a color range of black that is the darkest color in the YCrCb color space.

Figure 11:
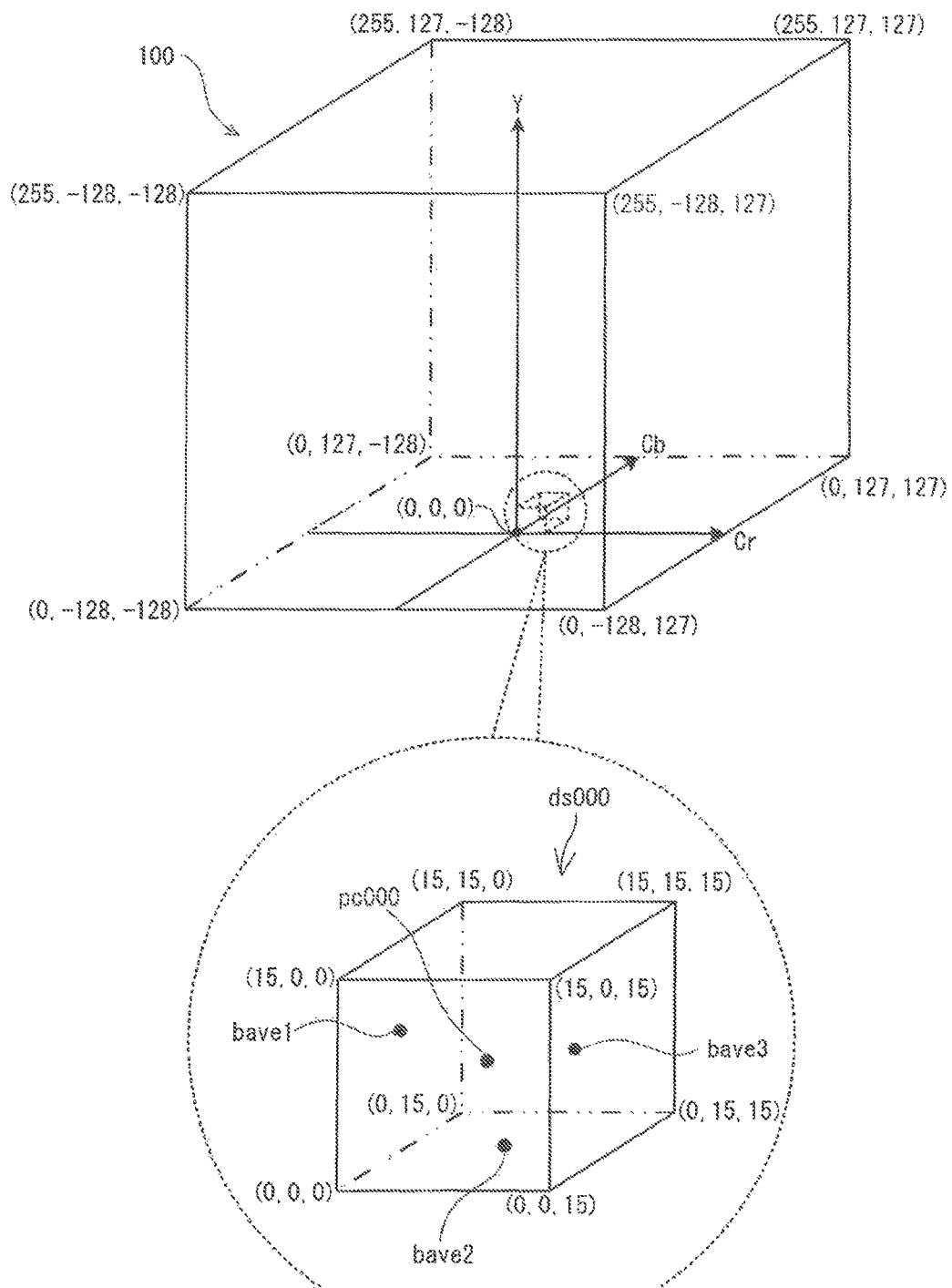
FIG. 11 is a conceptual diagram of a three-dimensional table.

As shown in FIG. 11, when a per block average "bave1" of the divided block "B066" is (9, 2, 2), the CPU 21 registers the identification information and the per block average "bave1" of the divided block "B066" in the color definition area "ds000." Similarly, the CPU 21 registers the block identification information and the per block average of each of all the 256 divided blocks included in the original image data 9 (refer to FIG. 9), in each of the corresponding color definition areas. As a result, 96 per block averages are registered in the three-dimensional table 100. In the present example, three per block averages "bave1," "bave2" and "bave3" are registered in the color definition area "ds000."

Next, the CPU 21 calculates the posterization candidate color (pcY, pcCb, pcCr) for each of the color definition areas of the three-dimensional table 100, in the following manner (step S93). For example, when the CPU 21 calculates a posterization candidate color "pc000" of the color definition area "ds000," the CPU 21 calculates, as pcY, the mean value of each of the Y values of "bave1," "bave2" and "bave3." Similarly, based on the three per block averages, the CPU 21 calculates the mean value of the Cb values as pcCb and calculates the mean value of the Cr values as pcCr. The CPU 21 calculates the posterization candidate color for each of all the color definition areas for which the per block average is registered. Therefore, the posterization candidate colors of the same number as the color definition areas in which at least one per block average is registered are registered in the three-dimensional table 100.

Figure 12:
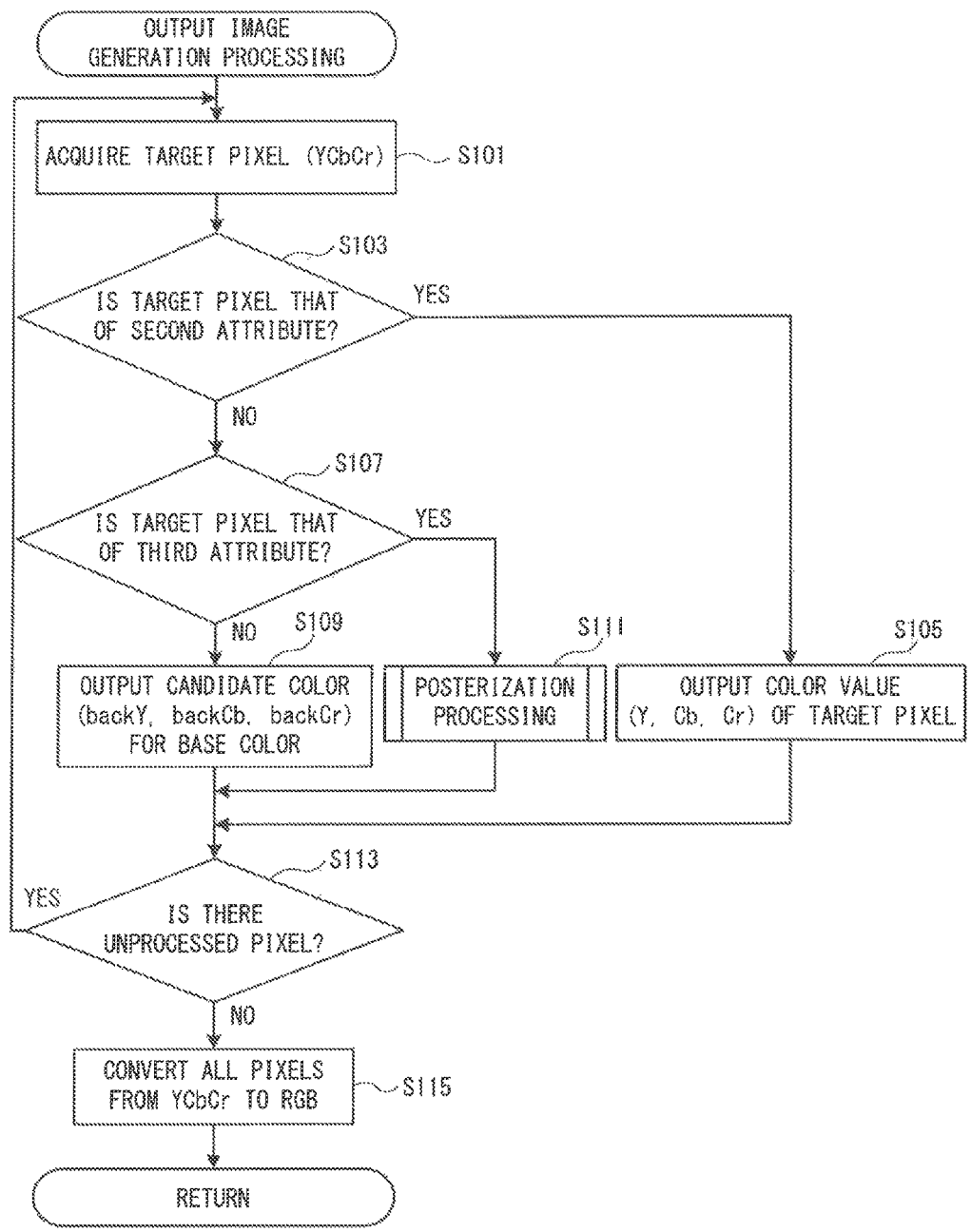
FIG. 12 is a flowchart of output image generation processing.

In the main processing shown in FIG. 2, after performing the processing at step S9, the CPU 21 performs output image generation processing shown in FIG. 12 (step S11). As shown in FIG. 12, first, the CPU 21 acquires the target pixel from all the pixels in the YCbCr color space obtained by the color space conversion at step S71 (step S101). The target pixel acquired at step S101 is one of unprocessed pixels for which the output image generation processing has not been performed among all the pixels subjected to the color space conversion at step S71. Based on the attribute information of the target pixel stored in the RAM 23, the CPU 21 determines whether the target pixel is that of the second attribute (step S103). When it is determined that the target pixel is that of the second attribute (yes at step S103), the CPU 21 outputs the color value (Y, Cb, Cr) of the target pixel to the RAM 23 as it is (step S105).

When it is determined that the target pixel is not that of the second attribute (no at step S103), the CPU 21 determines whether the target pixel is that of the third attribute based on the attribute information of the target pixel stored in the RAM 23 (step S107). When it is determined that the target pixel is not that of the third attribute (no at step S107), the target pixel is that of the first attribute. In this case, the CPU 21 outputs the candidate color (backY, backCb, backCr) for the base color acquired at step S29 to the RAM 23, as the color value of the target pixel (step S109). When it is determined that the target pixel is that of the third attribute (yes at step S107), the CPU 21 performs posterization processing (refer to FIG. 13) that will be described later (step S111).

After performing the processing at one of step 105, step 109 and step 111, the CPU 21 determines whether there is an unprocessed pixel (step S113). When it is determined that there is no unprocessed pixel (no at step S113), the CPU 21 returns the processing to the main processing (refer to FIG. 2). When it is determined that there is an unprocessed pixel (yes at step S113), the CPU 21 returns the processing to step S 101, and acquires a subsequent unprocessed pixel as the target pixel. The processing from step S101 onward is the same as that described above.

Figure 13:
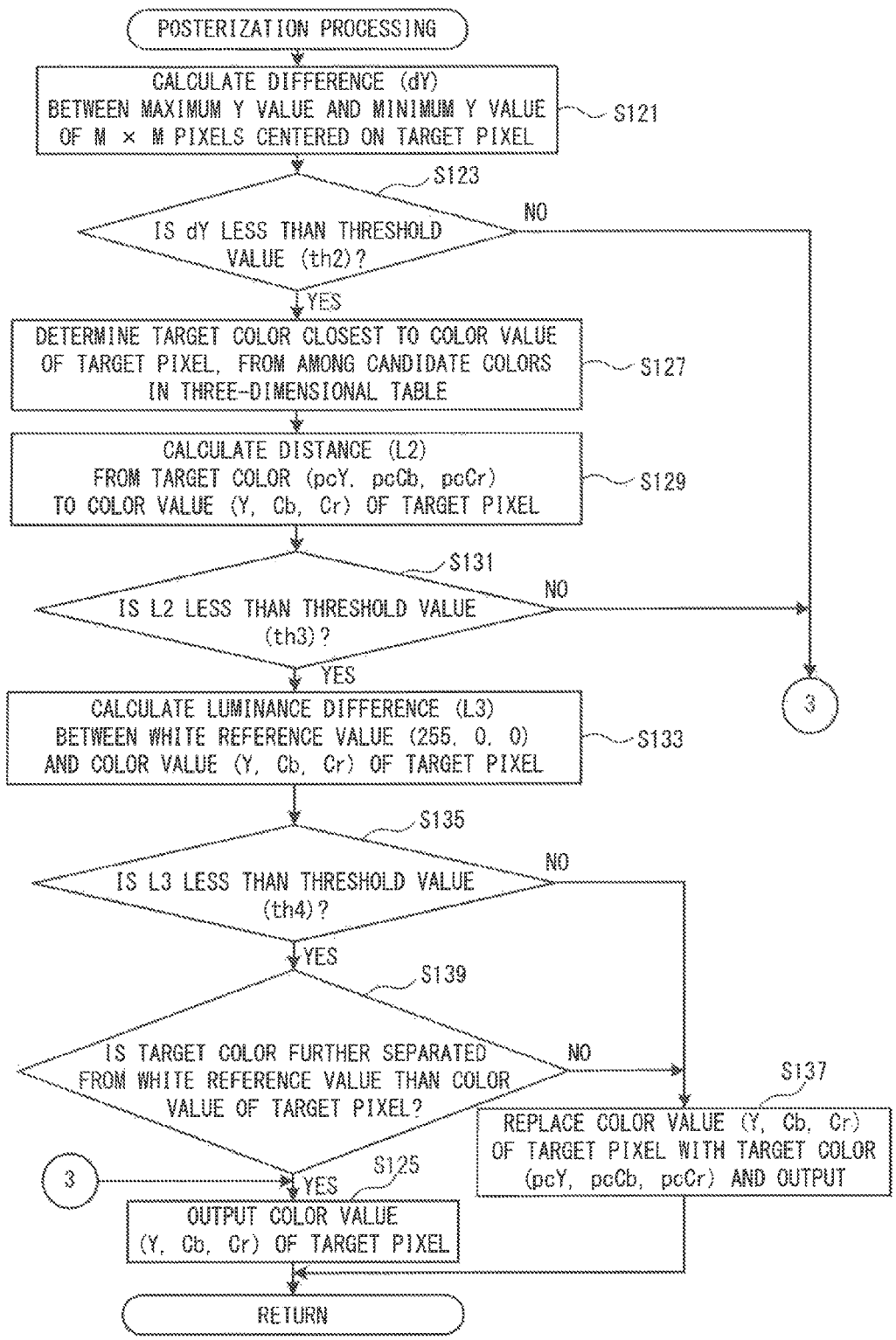
FIG. 13 is a flowchart of posterization processing.

In the posterization processing shown in FIG. 13, first, the CPU 21 acquires the Y value of each of the pixels included in the area of M×M pixels centered on the target pixel acquired at step S101. The CPU 21 calculates dY, which is a difference between a maximum Y value and a minimum Y value among the plurality of acquired Y values (step S121). dY indicates a variation amount of the color values of the plurality of pixels within a predetermined range (M×M pixels) including the target pixel.

The CPU 21 determines whether the calculated dY is less than a threshold value (th2) (step S123). th2 is a threshold value for determining a variation of the luminance (the Y value) in the M×M pixels and is, for example, "60." When it is determined that dY is not less than th2 (no at step S123), the variation of the luminance in the M×M pixels is relatively large. In this case, the CPU 21 outputs the color value (Y, Cb, Cr) of the target pixel to the RAM 23 as it is (step S125), and returns the processing to the output image generation processing (refer to FIG. 12).

When it is determined that dY is less than th2 (yes at step S123), the variation of the luminance in the M×M pixels is relatively small. In this case, the CPU 21 determines a target color that is closest to the color value of the target pixel, from among the posterization candidate colors registered in the three-dimensional table 100 (refer to FIG. 11) (step S127). Note that, using the same technique as Expression (4), the CPU 21 calculates distances from the color value (Y, Cb, Cr) of the target pixel to each of the posterization candidate colors (pcY, pcCb, pcCr), respectively. Each of the calculated distances is a Euclidean distance in the YCbCr color space. The CPU 21 may determine, as the target color, the posterization candidate color for which the calculated distance is the shortest.

The CPU 21 calculates L2, which is a distance from the determined target color (pcY, pcCb, pcCr) to the color value (Y, Cb, Cr) of the target pixel (step S129). L2 is a Euclidean distance in the YCbCr color space. Note that the CPU 21 may calculate L2 using the same technique as Expression (4). The CPU 21 determines whether the calculated L2 is less than a threshold value (th3) (step S131). th3 is a threshold value for determining whether the target color is close to the color value of the target pixel and is, for example, "20."

When it is determined that L2 is not less than th3 (no at step S131), the target color is not close to the color value of the target pixel. In this case, the CPU 21 performs the processing at step S125, outputs the color value of the target pixel to the RAM 23 as it is, and returns the processing to the output image generation processing. When it is determined that L2 is less than th3 (yes at step S131), the target color is close to the color value of the target pixel. In this case, the CPU 21 calculates L3, which is a luminance difference between a white reference value (255, 0, 0) in the YCbCr color space and the color value (Y, Cb, Cr) of the target pixel (step S133). The white reference value is a color value of white in the YCbCr color space. In the present embodiment, the CPU 21 calculates, as L3, a value obtained by subtracting the Y value of the target pixel from the Y value "255" of white.

The CPU 21 determines whether the calculated L3 is less than a threshold value (th4) (step S135). th4 is a threshold value for determining whether the color value of the target pixel is close to white and is, for example, "32." When it is determined that L3 is not less than th4 (no at step S135), the color value of the target pixel is not close to white. In this case, the CPU 21 replaces the color value (Y, Cb, Cr) of the target pixel with the target color (pcY, pcCb, pcCr) determined at step S127, and outputs the replaced color value of the target pixel to the RAM 23 (step S137). After that, the CPU 21 returns the processing to the output image generation processing.

When it is determined that L3 is less than th4 (yes at step S135), the color value of the target pixel is close to white. In this case, the CPU 21 determines whether the target color is further separated from the white reference value than the color value of the target pixel in the YCbCr color space (step S139). In other words, the CPU 21 determines whether a distance between the target color and the white reference value is larger than a distance between the color value of the target pixel and the white reference value. In the present embodiment, when the luminance (the pcY value) of the target color is equal to or more than the luminance (the Y value) of the target pixel, it is determined that the target color is not further separated from the white reference value than the color value of the target pixel (no at step S139). In this case, the target color is a color with visually the same brightness as the color value of the target pixel, or a visually brighter color than the target pixel. The CPU 21 performs the processing at step S137, replaces the color value of the target pixel with the target color, and outputs the replaced color value of the target pixel to the RAM 23. Then, the CPU 21 returns the processing to the output image generation processing.

When the pcY value of the target color is less than the Y value of the target pixel, the CPU 21 determines that the target color is further separated from the white reference value than the color value of the target pixel (yes at step S139). In this case, the target color is a visually darker color than the color value of the target pixel. The CPU 21 performs the processing at step S125, outputs the color value of the target pixel to the RAM 23 as it is, and returns the processing to the output image generation processing.

Figure 14:
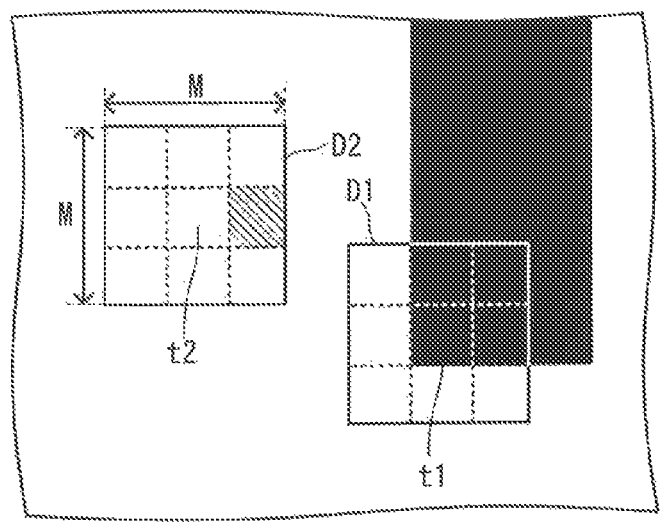
FIG. 14 is a specific example of M×M pixels based on original image data.

The processing shown in FIG. 13 will be specifically described with reference to FIG. 14 and FIG. 15. As shown in FIG. 14, when a target pixel t1 acquired at step S101 is a pixel of the third attribute (yes at step S107), the CPU 21 acquires dY from an area D1 of nine pixels (M=3) centered on the target pixel t1 (step S121). In the area D1, each of four pixels including the target pixel t1 shows the read character image. Five pixels of the nine pixels in the area D1, excluding these four pixels, indicate the base color image read from the sheet.

In this case, the minimum value of each of the Y values of the four pixels showing the character image is a minimum Y value of the area D1. The maximum value of each of the Y values of the five pixels showing the base color image is a maximum Y value of the area D1. A difference between the minimum Y value and the maximum Y value in the area D1 (i.e., a luminance difference in the area D1) is relatively large. When the color value of a target pixel t1 is replaced by a target color pc, a color difference between the target pixel t1 and surrounding pixels of the target pixel t1 becomes larger, and the hue of the original image may deteriorate. Accordingly, since dY is not less than th2 (no at step S123), the CPU 21 outputs the color value of the target pixel t1 as it is (step S125).

On the other hand, when the target pixel t2 acquired at step S101 is a pixel of the third attribute (yes at step S107), the CPU 21 acquires dY from an area D2 of 3×3 pixels centered on the target pixel t2 (step S121). In the area D2, one pixel adjacent to the right of the target pixel t2 shows a noise image of read minute dirt, for example. Eight pixels of the nine pixels in the area D2, excluding the aforementioned one pixel, show the base color image read from the sheet. In this case, the Y value of the one pixel showing the noise image is a minimum Y value of the area D2. The maximum value of each of the Y values of the eight pixels showing the base color image is a maximum Y value of the area D2. A difference between the minimum Y value and the maximum Y value in the area D2 (i.e., a luminance difference in the area D2) is relatively small. Accordingly, since dY is less than th2 (yes at step S123), the CPU 21 further performs processing described below.

Figure 15:
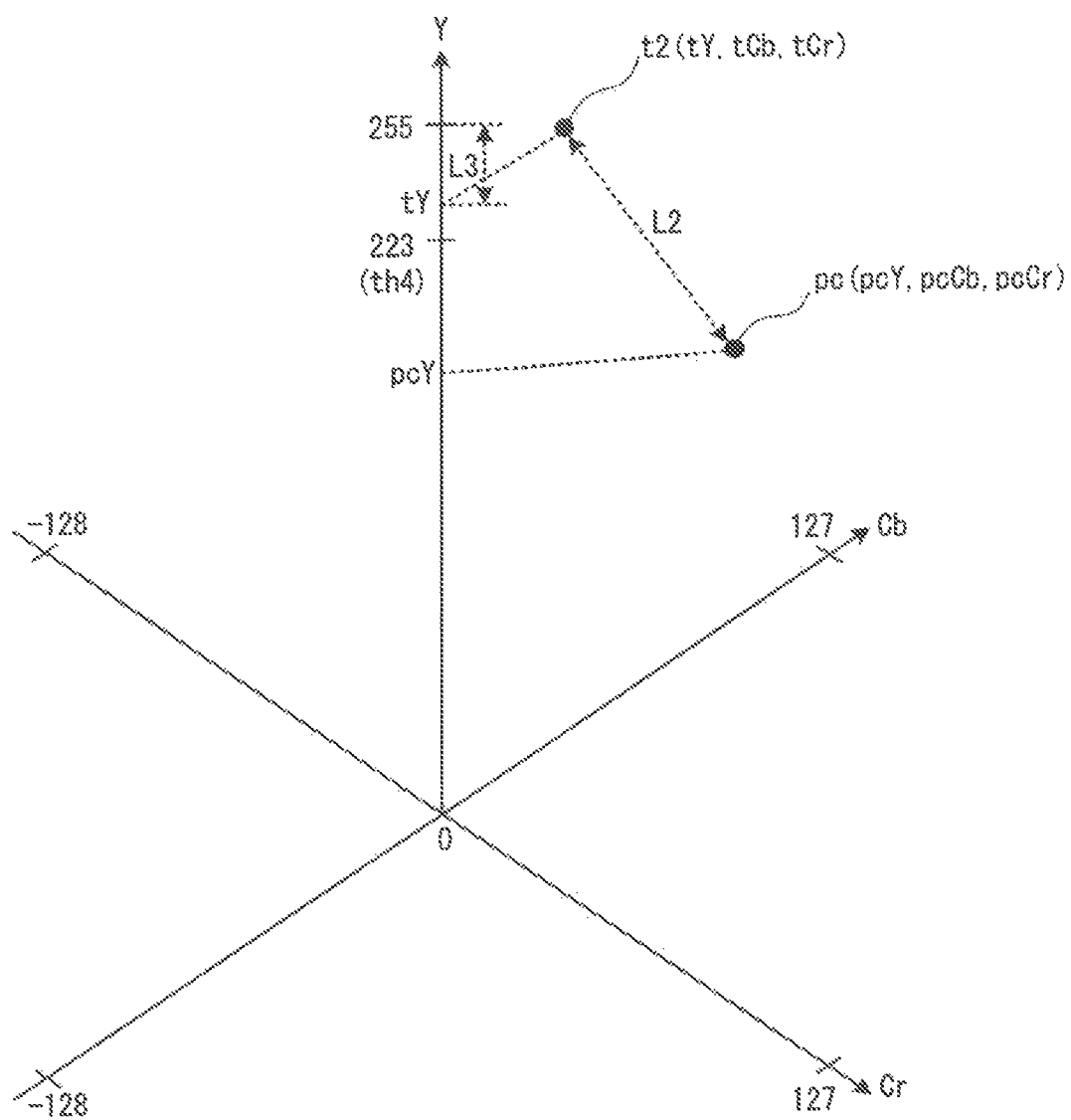
FIG. 15 is a diagram showing a YCbCr color space.

As shown in FIG. 15, the CPU 21 determines the target color pc (pcY, pcCb, pcCr) that is closest to a color value (tY, tCb, tCr) of the target pixel t2, from among the posterization candidate colors in the three-dimensional table 100 (step S127). The CPU 21 calculates the distance (L2) from the color value of the target pixel t2 to the target color pc (step S129). When L2 is not less than the threshold value (th3) (no at step S131), a color difference between the color value of the target pixel t2 and the target color pc is large. When the color value of the target pixel t2 is replaced by the target color pc, the hue of the target pixel t2 in the original image may deteriorate. Therefore, the CPU 21 outputs the color value of the target pixel t2 as it is (step S125).

When L2 is less than the threshold value (th3) (yes at step S131), the CPU 21 calculates the luminance difference (L3) between the Y value "255" of white and the tY value of the target pixel t2 (step S133). When the tY value is equal to or less than "233," L3 is equal to or more than the threshold value (th4) (no at step S135). The color of the target pixel t2 is not close to white. Therefore, the CPU 21 replaces the color value of the target pixel t2 with the target color pc, and outputs the replaced color value of the target pixel t2 (step S137). In this case, even if the luminance of the target pixel t2 after the replacement decreases, since the color of the target pixel t2 is not close to white, it is difficult to visually confirm the decrease in the luminance. It is thus possible to maintain the hue of the target pixel t2 before the replacement.

When the tY value exceeds "233," L3 is less than the threshold value (th4) (yes at step S135). The color of the target pixel t2 is close to white. Therefore, when the color value of the target pixel t2 is replaced by the target color pc, if the luminance of the target pixel t2 after the replacement decreases, it is easy for the decrease in the luminance to become visually noticeable. When the hue of the target pixel t2 becomes visually darker, the hue of the target pixel t2 before the replacement may deteriorate. To address this, the CPU 21 determines whether the pcY value of the target color is less than the tY value of the target pixel t2 (step S139).

When the pcY value is not less than the tY value (no at step S139), if the color value of the target pixel t2 is replaced by the target color pc, the luminance of the target pixel t2 after the replacement is maintained or increased. More specifically, the hue of the target pixel t2 does not visually change or becomes visually brighter. Therefore, the CPU 21 replaces the color value of the target pixel t2 with the target color pc and outputs the replaced color value of the target pixel t2 (step S137). On the other hand, when the pcY value is less than the tY value (yes at step S139), if the color value of the target pixel t2 is replaced by the target color pc, the luminance of the target pixel t2 after the replacement decreases, and the hue of the target pixel t2 after the replacement becomes visually darker. Therefore, the CPU 21 outputs the color value of the target pixel t2 as it is (step S125).

In the output image generation processing shown in FIG. 12, when it is determined that there is no unprocessed pixel (no at step S113), the color values (Y, Cb, Cr) of each of all the pixels of the original image data are output to the RAM 23. In this case, the CPU 21 inversely converts each of the color values of all the pixels output to the RAM 23 to the RGB color space, using Expressions (1) to (3) (step S115). In this way, the CPU 21 acquires the processed BMP image data and stores it in the HDD 24. After that, the CPU 21 returns the processing to the main processing (refer to FIG. 2) and ends the main processing. Note that the CPU 21 may store the processed image data (for example, JPEG image data) of the YCbCr color space in the HDD 24, without performing the processing at step S115.

In the processed image data, the color value of a specific pixel included in the pixels of the third attribute has been replaced by the posterization candidate color that is closest to the color value of the specific pixel. Among the pixels of the third attribute, the specific pixel is a pixel having a color value that is not close to white, or a pixel having a luminance that is equal to or more than the luminance of the target color. Thus, the color value of the specific pixel included in the original image data may be replaced by the posterization candidate color that is closest to the color value of the specific pixel. It may be possible to improve the image quality of the original image data while maintaining the hue of the original image.

In the processed image data, the color values of the pixels of the first attribute have been replaced by the candidate color for the base color. In other words, the color values of all the pixels included in the color range of the background color are unified to the candidate color for the base color. Therefore, the image quality of the original image data may be improved. In the processed image data, the color values of the pixels of the second attribute are maintained as they are. Since the color values of the pixels of the second attribute are included in the dark color range, even when a noise image is included in the pixels of the second attribute, it may be difficult for the user to visually distinguish the noise image. Thus, the hue of the original image may be maintained by not replacing the color values of the pixels of the second attribute.

Note that various modifications can be made to the above-described embodiment. For example, the main processing (refer to FIG. 2) may be performed by a CPU of the image reading apparatus 1. In this case, after reading an image from the original document 1A, the CPU of the image reading apparatus 1 may perform the main processing on the generated original image data. The CPU of the image reading apparatus 1 may transmit the processed image data generated by the main processing to the PC 2.

In the posterization processing (step S111), the CPU 21 may perform the processing at step S127 and step S137 on all the pixels of the third attribute. In this case, the color values of all the pixels of the third attribute included in the original image data can be replaced by the target color. The CPU 21 need not necessarily perform the processing from step S79 to step S87. In this case, the per block averages of the same number as the plurality of divided blocks can be registered respectively in the corresponding color definition areas of the three-dimensional table 100.

The CPU 21 need not necessarily perform the processing at step S121 and step S123. In this case, the color values of the pixels of the third attribute within an area in which the variation of the color values is large can be replaced by the target color. The CPU 21 need not necessarily perform the processing at step S129 and step S131. In this case, the colors of the pixels of the third attribute that are not close to the target color can be replaced by the target color. The CPU 21 need not necessarily perform the processing at step S133 and step S135. In this case, the color values of the pixels of the third attribute that are close to white can be replaced by the target color. The CPU 21 need not necessarily perform the processing at step S139. In this case, the color values of the pixels of the third attribute can be replaced by the target color that is darker than the color values of the pixels of the third attribute.

At step S133, the CPU 21 may calculate, as L3, a Euclidean distance between the white reference value (255, 0, 0) and the color value (Y, Cb, Cr) of the target pixel in the YCbCr color space. In this case, it may be possible to more accurately determine whether the color value of the target pixel is close to white. At step S139, the CPU 21 may determine whether the target color is further separated from the white reference value than the color value of the target pixel, based on a Euclidean distance from the target color (pcY, pcCb, pcCr) to the white reference value (255, 0, 0), and a Euclidean distance from the color value (Y, Cb, Cr) of the target pixel to the white reference value (255, 0, 0). In this case, it may be possible to more accurately determine which of the color value of the target pixel and the target color is closer to white (namely, which is visually brighter).

In the main processing of the above-described embodiment, the image format of the original image data is converted from the RGB color space to the YCbCr color space. The image format of the original image data is not limited to the RGB color space, and may be another color space (for example, a CMYK color space). The image format of the original image data may be converted to another color space (for example, a YUV color space) that is different from the YCbCr color space.

According to the above-described embodiment, the CPU 21 identifies the pixels of the first attribute from among the plurality of pixels included in the original image data (no at step S61, step S63). The pixels of the first attribute are pixels having color values included in the color range of the background color. The CPU 21 identifies the pixels of the second attribute from among the plurality of pixels included in the original image data (yes at step S55, step S57). The pixels of the second attribute are pixels having color values included in the dark color range. With respect to each of the plurality of divided blocks included in the original image data, the CPU 21 registers the per block average (baveY, baveCb, baveCr) representing the color values of the plurality of pixels included in the divided block in the three-dimensional table 100 of the RAM 23, as the posterization candidate color (pcY, pcCb, pcCr) (step S89, step S93). The CPU 21 can replace the color value of the target pixel among the plurality of pixels included in the original image data with the target color, which is the posterization candidate color that is closest to the color value of the target pixel (step S111). The target pixel is a pixel of the third attribute that is different from the identified pixels of the first attribute and the identified pixels of the second attribute.

In this way, the color value of the target pixel included in the original image data can be replaced with the posterization candidate color that is closest to the color value of the target pixel. Therefore, the CPU 21 may improve the image quality of the original image data while maintaining the hue of the image to some extent.

With respect to each of the plurality of divided blocks included in the original image data, the CPU 21 registers the per block average (baveY, baveCb, baveCr) representing the color values of the plurality of pixels included in the divided block in the three-dimensional table 100 of the RAM 23, as the posterization candidate color (pcY, pcCb, pcCr) (step S89, step S93). The CPU 21 determines whether the distance (L3) from the color value of the pixel of the third attribute (the target pixel) to the white reference value in the YCbCr color space is less than the threshold value (th4) (step S135). The CPU 21 determines whether the color value of the target color is further separated from the white reference value than the color value of the target pixel (step S139). With respect to the target pixel for which it is determined that L3 is not less than th4 or the target pixel for which it is determined that the color value of the target color is not further separated from the white reference value than the color value of the target pixel, the CPU 21 replaces the color value of the target pixel with the target color (step S137). The CPU 21 maintains the color value of the target pixel for which it is determined that L3 is less than th4 and it is determined that the color value of the target color is further separated from the white reference value than the color value of the target pixel (step S125).

In this way, when one of the target pixels included in the original image data is close to the color value of white, if the hue of the image does not become darker even when the color value of that pixel is replaced by the target color, which is the posterization candidate color closest to the color value of that pixel, the color value of that pixel can be replaced by the target color. Therefore, the CPU 21 may improve the image quality of the original image data while suppressing the hue of the image from becoming dark.

The CPU 21 calculates the variation amount (qY/qCb/qCr) for each of the plurality of divided blocks (step S85). The CPU 21 registers the per block average of a specific divided block, as a candidate color (no at step S87, step S89). The specific divided block is a divided block for which the calculated variation amount (qY/qCb/qCr) is equal to or more than the variation determination threshold value (bthresh). In this way, it may be possible to inhibit the posterization candidate color from being generated based on the divided block for which the variation of the color values of the pixels is large.

The CPU 21 registers, as the posterization candidate color, the average (baveY, baveCb, baveCr) of the color values in the YCbCr color space that is calculated based on the color values of the plurality of pixels included in the divided block (step S93). In this way, the CPU 21 may simply and accurately register the color value of the representative color of the divided block.

The CPU 21 calculates the distance (L2) between the color value of the target pixel and the target color in the YCbCr color space (step S129). When the calculated L2 is less than the threshold value (th3), the CPU 21 replaces the color value of the target pixel with the target color (yes at step S131, step S137). When the calculated L2 is equal to or more than th3, the CPU 21 maintains the color value of the target pixel (no at step S131, step S125). In this way, it may be possible to inhibit the color value of the target pixel from being replaced by the target color that is significantly different from the color value of the target pixel.

The CPU 21 calculates the variation amount (dY) of the color values of the M×M pixels including the target pixel of the original image data (step S121). When the calculated dY is less than the threshold value (th2), the CPU 21 replaces the color value of the target pixel with the target color (yes at step S123, step S137). When the calculated dY is equal to or more than th2, the CPU 21 maintains the color value of the target pixel (no at step S123, step S125). In this way, it may be possible to inhibit the color value of the target pixel in an area in which the variation of the color values is large from being replaced by the target color.

The CPU 21 replaces the color values of the pixels of the first attribute included in the original image data with the candidate color (backY, backCb, backCr) for the base color included in a color value range corresponding to the color of the sheet (step S109). The CPU 21 maintains the color values of the pixels of the second attribute included in the original image data (step S105). In this way, by replacing the background color pixels with the candidate color for the base color, it may be possible to improve the image quality of the original image data. By maintaining the dark color pixels, it may be possible to maintain the hue of the image.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible.

Accordingly, the examples, as set forth above, are intended to be illustrative. Various changes may be made without departing from the broad spirit and scope of the underlying principles.

What is claimed is:

1. A non-transitory computer-readable medium storing computer-readable instructions, the instructions, when executed by a processor of an image processing apparatus, performing processes comprising:
    registering, in a storage, a candidate color for each of a plurality of divided areas included in image data indicating an image on a sheet, the candidate color being a color value of a representative color representing color values of a plurality of pixels included in the divided area;
    determining whether a first color distance is less than a first threshold value, the first color distance being a distance in a three-dimensional color space between a color value of a target pixel and a white reference value corresponding to a color value of white, the target pixel being one of the plurality of pixels included in the image data;
    determining whether a color value of a target color is further separated from the white reference value than the color value of the target pixel in the three-dimensional color space, the target color being the candidate color closest to the color value of the target pixel among the plurality of candidate colors registered in the storage; and
    replacing, when it is determined that the first color distance is not less than the first threshold value or when it is determined that the color value of the target color is not further separated from the white reference value than the color value of the target pixel, the color value of the target pixel with the target color, without replacing the color value of the target pixel when it is determined that the first color distance is less than the first threshold value and it is determined that the color value of the target color is further separated from the white reference value than the color value of the target pixel.

2. The non-transitory computer-readable medium according to claim 1, wherein the processes further comprise:
    calculating a second color distance, the second color distance being a distance between the color value of the target pixel and the target color in the three-dimensional color space,
    wherein
    the replacing of the color value of the target pixel includes replacing the color value of the target pixel with the target color when the calculated second color distance is less than a second threshold value without replacing the color value of the target pixel when the calculated second color distance is equal to or more than the second threshold value.

3. The non-transitory computer-readable medium according to claim 1, wherein the processes further comprise:
    calculating a first value for each of the plurality of divided areas based on color values of a plurality of pixels included in each of the plurality of divided areas, the first value indicating that the larger the first value, the smaller a variation of the color values of the plurality of pixels included in the divided area,
    wherein
    the registering of the candidate color includes registering, as the candidate color, a color value of a representative color representing color values of a plurality of pixels included in a specific one of the divided areas, the specific divided area being the divided area for which the calculated first value is equal to or more than a third threshold value.

4. The non-transitory computer-readable medium according to claim 1, wherein
    the registering of the candidate color includes registering, as the candidate color, an average of color values in the three-dimensional color space that is calculated based on the color values of the plurality of pixels included in the divided area.

5. The non-transitory computer-readable medium according to claim 1, wherein the processes further comprise:
    calculating a second value for a predetermined area including the target pixel of the image data based on color values of a plurality of pixels included in the predetermined area, the second value indicating that the larger the second value, the larger a variation of color values of a plurality of pixels within the predetermined area,
    wherein
    the replacing of the color value of the target pixel includes replacing the color value of the target pixel with the target color when the calculated second value is less than a fourth threshold value without replacing the color value of the target pixel when the calculated second value is equal to or more than the fourth threshold value.

* * * * *